(12) United States Patent
Kemble et al.

(10) Patent No.: US 6,658,386 B2
(45) Date of Patent: Dec. 2, 2003

(54) DYNAMICALLY ADJUSTING SPEECH MENU PRESENTATION STYLE

(75) Inventors: Kimberlee A. Kemble, Boca Raton, FL (US); James R. Lewis, Delrey Beach, FL (US); Vanessa V. Michelini, Coconut Creek, FL (US); Margarita Zabolotskaya, Palm Beach, FL (US)

(73) Assignee: International Business Machines Corporation, Armonk, NY (US)

(*) Notice: Subject to any disclaimer, the term of this patent is extended or adjusted under 35 U.S.C. 154(b) by 365 days.

(21) Appl. No.: 09/735,693

(22) Filed: Dec. 12, 2000

(65) Prior Publication Data

US 2002/0072910 A1 Jun. 13, 2002

(51) Int. Cl.[7] .................. G01L 21/00; G01L 15/06; G09G 5/377
(52) U.S. Cl. .................. 704/270; 704/270.1; 704/235; 704/243; 704/275; 345/817; 345/825
(58) Field of Search ................ 704/270, 270.1, 704/275, 257, 235, 243; 725/151; 345/764, 817, 825

(56) References Cited

U.S. PATENT DOCUMENTS 5,574,965 A * 11/1996 Welmer ............... 725/151
5,675,707 A * 10/1997 Gorin et al. .......... 704/257
5,953,011 A * 9/1999 Matsuoka ............ 345/764
6,094,476 A * 7/2000 Hunt et al. ........... 704/275
2001/0032076 A1 * 10/2001 Kursh .................. 704/257

FOREIGN PATENT DOCUMENTS

JP    11-337366     * 12/1999   ............ G10L/3/00
JP    2000-067319   *  2/2000   ............ G06F/3/00

OTHER PUBLICATIONS

Seneff et al ("A New Restaurant Guide Conversational System: Issues In Rapid Prototyping For Specialized Domains", 4th International Conference on Spoken Language, Oct. 1996).*

* cited by examiner

Primary Examiner—Vijay Chawan
Assistant Examiner—Daniel A. Nolan
(74) Attorney, Agent, or Firm—Akerman Senterfitt

(57) ABSTRACT

A method for adjusting a speech menu interface in a speech recognition system. The method can include a series of steps which can include identifying one or more menu items from a data structure in memory for presentation using the speech menu interface. The step of retrieving the one or more menu items from the data structure can be included. Also, the step of reading at least one attribute corresponding to the one or more menu items with menu item criteria can be included. Based on the comparing step, the method can include selecting a presentation style for presentation of the one or more menu items using the speech menu interface.

19 Claims, 2 Drawing Sheets

DYNAMICALLY ADJUSTING SPEECH MENU PRESENTATION STYLE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer driven user interfaces, and more particularly, to speech based computer driven user interfaces.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Improvements to speech recognition systems provide an important way to enhance user productivity.

Speech recognition systems also can function as a user interface to another computer based system. As such, speech recognition systems enable users to interact with computer based systems in a more natural and less mechanistic manner. A common example of a speech interface can be a speech menu interface for enabling an end user to verbally select an item from an audible set of prompts or speech menu items. A speech menu interface typically operates over a communication connection, such as a conventional telephone connection, to provide end users with a series of menu items from which to choose. For example, a speech menu interface can be incorporated within a system for routing incoming telephone calls based on an end user specified call destination.

Speech menu interfaces can be implemented using several different methods. One method is to associate each menu item with a numeric value which the user can choose by speaking the number into the telephone or pressing the corresponding number button on the telephone. Such implementations, called representative style presentation, are beneficial when the speech menu items are long, complex, or difficult to remember. For example, a speech menu interface can present the following items to an end user: "For the Communications Product Hardware and Software Department press 1, For the Personal Computer Product Department including Hardware and Software press 2". Notably, the department names among which the end user is choosing are long and difficult to remember. By providing a numeric value associated with each item, the end user need only remember the number associated with the desired item rather than the entire item name.

Another method of implementing a speech interface is to allow the end user to directly speak the desired item into the telephone. This implementation, called literal style presentation, is beneficial when the menu items are short, less complicated, or easier to remember. Notably, literal style presentation can be a more desirable and direct method of allowing an end user to choose a menu item. For example, a speech menu interface can provide the following menu items to an end user: "Please say one of the following departments: Marketing, Finance, Human Resources, Accounting". In this case, the end user need only say a department name for the end user's call to be forwarded to the specified department.

Both representative style presentation and literal style presentation implementations of speech menu interfaces offer advantages. Accordingly, a system designer can plan and implement the proper speech interface in situations where the menu items are known in advance to the designer. However, some computer based systems generate menus dynamically, extracting menu items from a database of possible menu items. In this case, a design decision is made by the system designer even though the menu items which ultimately will be presented to the user are not known. Because the system designer must choose an implementation, i.e., representative style presentation or literal style presentation, without knowing which menu items ultimately will be presented to a user, the resulting speech menu can sound confusing and overly complicated. Thus, the benefits of a speech menu interface can be lost.

SUMMARY OF THE INVENTION

The invention concerns a method for adjusting a speech menu interface as a function of attributes of speech menu items or prompts. The method of the invention can select a presentation style for presenting speech menu items after dynamically selecting the speech menu items from a database of possible speech menu items. The selection of a presentation style can be based upon speech menu item attributes corresponding to the complexity of a speech menu item. Speech menu item complexity can correspond to the level of difficulty experienced by users in pronouncing the speech menu item or in remembering the speech menu item. Thus, the attributes can reflect complexity indicators such as length information of speech menu items, length information of individual text strings within speech menu items, or both. Additional complexity indicators can include whether the menu item includes acronyms, foreign words, words of art such as medical or legal terms, or any words determined through an empirical study to be complex. Based on the speech menu item attributes, a presentation style can be selected for presenting the items through the speech menu interface.

The inventive method taught herein can begin by identifying one or more speech menu items (menu items) from a data structure in memory for presentation using the speech menu interface. The method further can include retrieving the one or more menu items from the data structure. The step of reading at least one attribute corresponding to the menu items can be included. Notably, the method can include determining the attributes corresponding to the menu items. The attributes can be a binary indicator or a score corresponding to the complexity of the menu items. The reading step can include comparing the attributes corresponding to the menu items with menu item criteria. Notably, the menu item criteria can be one or more threshold values. Based on the reading step, the method can include selecting a presentation style for presentation of the one or more menu items using the speech interface. The presentation style can be literal style presentation or representative style presentation. Further, the method can include presenting the one or more menu items through the speech menu interface using the selected presentation style.

Another embodiment of the invention can be a method of adjusting a speech menu interface. In that case, the method can include identifying one or more menu items from a data structure in memory for presentation using the speech menu interface. The step of retrieving one or more menu items from the data structure can be included. The additional step of reading at least one attribute corresponding to the menu items can be included. The reading step also can include comparing the attributes with menu item criteria, where the menu item criteria can include one or more threshold values. Based on the reading step, the method can include selecting a presentation style for presentation of the one or more menu items using the speech menu interface. Additionally, the step of presenting the one or more menu items through the speech menu interface using the selected presentation style can be included.

Another aspect of the invention can be a machine readable storage, having stored thereon a computer program having a plurality of code sections executable by a machine for causing the machine to perform a series of steps. The steps can include identifying one or more menu items from a data structure in memory for presentation using the speech menu interface. The step of retrieving the one or more menu items from the data structure and reading at least one attribute corresponding to the menu items can be included. Notably, the step of determining the attributes corresponding to the menu items can be included. The attributes can include a binary indicator or a score corresponding to the complexity of the menu items. The reading step can include comparing the attributes corresponding to the menu items with menu item criteria, which can include one or more threshold values. Based on the reading step, the step of selecting a presentation style for presentation of the one or more menu items using the speech interface can be included. The presentation style can be literal style presentation or representative style presentation. Further, the step of presenting the one or more menu items through the speech menu interface using the selected presentation style can be included.

BRIEF DESCRIPTION OF THE DRAWINGS

There are shown in the drawings embodiments which are preferred, it being understood, however, that the invention is not so limited to the precise arrangements and instrumentalities shown, wherein.

DETAILED DESCRIPTION OF THE INVENTION

Figure 1:
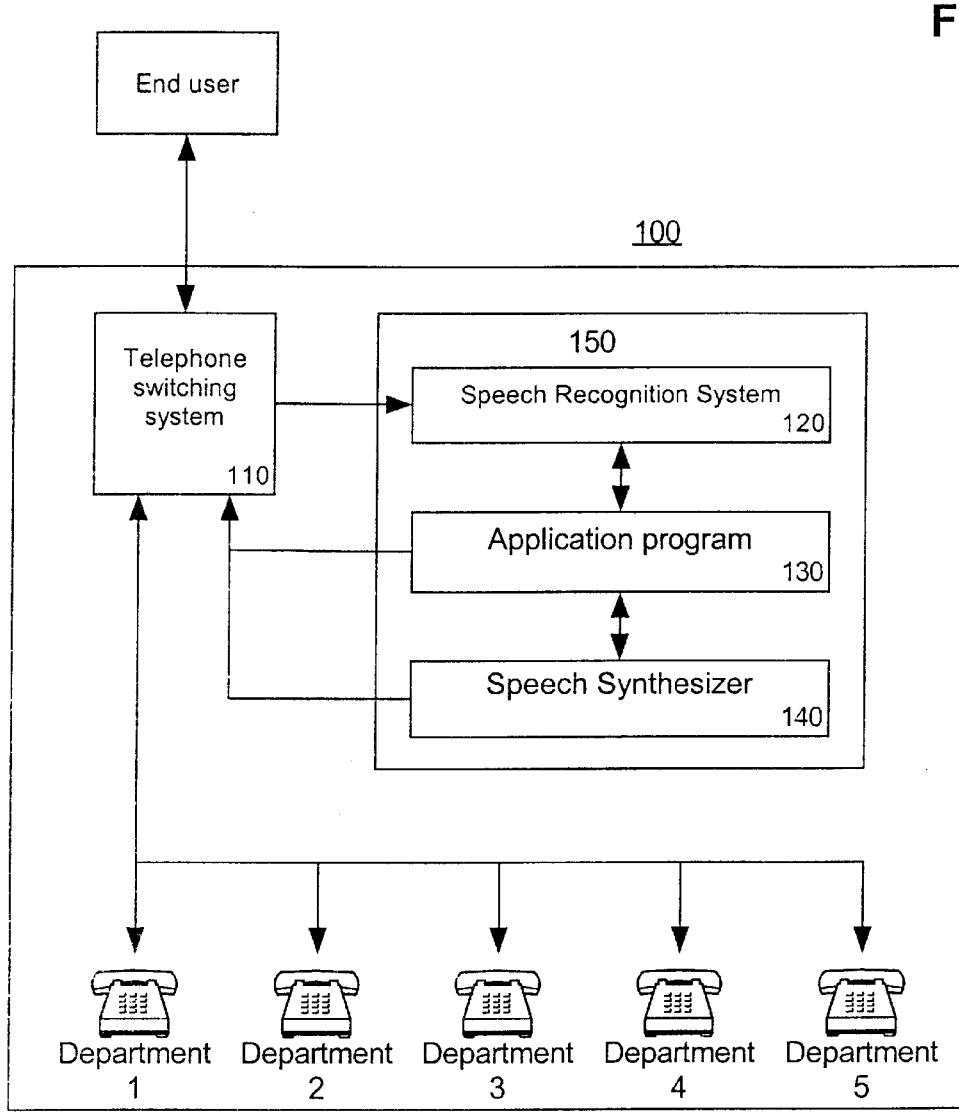
FIG. 1 is a schematic of an exemplary network configuration capable of utilizing the method of the invention.

The invention combines speech recognition technology with dynamic creation of speech menus to provide a method of adjusting a speech menu interface. Particularly, the invention can select a presentation style for presenting speech menu items (menu items) to an end user through a speech menu interface. The selection of a presentation style can be a function of menu item attributes which can correspond to the complexity of a menu item. The complexity of a menu item can correspond to the level of difficulty experienced by users in pronouncing the menu item or in remembering the menu item once heard through a speech interface. The invention can exist within a speech recognition system as one or more application programs or plug-ins. Further, the speech recognition system can include one or more application programs, and optionally, a speech synthesizer.

The invention can detect situations when a computer communication system dynamically generates a speech menu. Accordingly, in such situations, the SRS can retrieve one or more menu items from a data structure stored in memory which can contain each possible menu item. Notably, the data structure can be a table, a database, or any other suitable structure for storing data.

After retrieving the menu items from the data structure, the invention can read attributes of each retrieved menu item from memory, or alternatively derive the attributes dynamically. Attributes can indicate a suitable presentation style for presenting the menu item or can be compared with predetermined menu item criteria for selecting a suitable presentation style. As mentioned, attributes of the menu items can reflect complexity indicators such as length information of menu items, length information of individual text strings within menu items, or both. Additional complexity indicators can include whether the menu item includes acronyms, foreign words, words of art such as medical or legal terms, any words determined through an empirical study to be complex, or whether in a system designer's subjective opinion the menu item is complex. The aforementioned indicators can influence the likelihood that a user can pronounce or remember the menu item once heard. Regardless of how the complexity of a menu item is determined, the attributes can be defined using a numerical scoring system where the aforementioned complexity indicators can influence a menu item complexity score. The menu items can have an attribute reflecting a score corresponding to each individual complexity indicator, or a single attribute reflecting an overall complexity score inclusive of one or more complexity indicators. Alternatively, the attribute can be a flag bit where the presence of any one word defined within the system as being complex can cause the flag bit to indicate that the menu item is complex, rather than keeping a numerical score. For example, particular menu items containing foreign words, acronyms, medical or legal terminology, or other terms of art, can be considered complex.

The invention can dynamically determine length attributes of an entire retrieved menu item and lengths of individual text strings, including words, within the menu item. Alternatively, the invention can contain the attributes in memory. If the attributes are determined dynamically, the invention can count characters, words, recording length, or search a menu item for the existence of a word defined within the system as complex.

The predetermined item criteria can include one or more threshold values corresponding to menu item attributes. By comparing the attributes of the retrieved menu items with the predetermined menu item criteria, the speech recognition system (SRS) can determine the relative complexity of a menu item, and thus, select a suitable presentation style, representative or literal, for presenting menu items through the speech menu interface.

A representative presentation style can be any speech menu implementation where menu items are associated with either a symbol which the user can easily speak into the telephone, or a control on a telephone which the user can activate. In either case, the user need not repeat a menu item selection, but rather speak a symbol or activate a control such as a numeric button on a telephone to select a menu item. Such implementations can be beneficial when the menu items are considered complex. A literal presentation style can be any speech menu implementation where the end user can speak the desired menu item directly into the telephone or other interface device. This implementation can be beneficial when the menu items are short, less complicated, or easier to remember. It should be appreciated that the invention can contain suitable code for implementing both of the aforementioned presentation styles, and further, that the presentation styles are known to those skilled in the art of speech based user interfaces.

FIG. 1 depicts an exemplary system 100 containing a telephone switching system 110, a computer system 150, a SRS 120, at least one application program 130, and an optional speech synthesizer 140. System 100 can be any system incorporating a speech menu interface for interacting with a user such as an automated computer based telephone answering system capable of directing telephone calls among multiple users. For example, such systems can include reservation systems and automated help desks.

Telephone switching system 110 of system 100 can be any conventional on premise telephone switching system, such a, a private automatic branch exchange (PABX) for providing call routing functions within a private enterprise. SRS 120, application program 130, and speech synthesizer 140 can be computer programs written in C or another suitable programming language contained in computer system 150. Notably, although SRS 120, application program 130, and optional speech synthesizer 140 are illustrated as separate programs, the programs can exist in varying combinations or as a single more complex program. For example, SRS 120 can be combined with optional speech synthesizer 140, or application program 130, or any combination thereof. Notably, the functionality of SRS 120 and optional speech synthesizer 140 can be included within application program 130 as a plug-ins or as software development tool modules. It should be appreciated that system 100 can contain an apparatus for playing recorded menu items. For example, the telephone switching system 110 can play recorded menu items or a separate apparatus for playing recorded menu items can be included. Thus system 100 can contain either an apparatus for playing recorded menu items, digital and/or analog, or optional speech synthesizer 140, or both.

Computer system 150 can be equipped with the necessary hardware, i.e., audio circuitry (sound card) and modem, to perform speech recognition and speech synthesis functions. The various hardware requirements for the computer system as described herein can generally be satisfied by any one of many commercially available high speed multimedia personal computers offered by manufacturers such as International Business Machines Corporation. It should be appreciated that computer system 150 can contain an operating system (not shown), which can be one of the Windows family of operating systems available from Microsoft Corporation of Redmond, Wash. However, the system is not limited in this regard, and the invention also can be used with any other type of computer operating system. The system as disclosed herein can be implemented by a programmer, using commercially available development tools for the operating systems described above.

In operation, an end user can initiate a communications session with system 100 through a conventional communications link. More specifically, the communications link can be a data connection through a computer communications network, the Internet, or a voice connection via telephone. For example, using a conventional telephone connection, the end user may contact system 100 by dialing a service telephone number and initiating voice communication with system 100. In response, system 100 can answer the end user's telephone call and provide recorded menu items through telephone switching system 110 or a separate apparatus for playing recorded menu items. Alternatively, menu items can be provided through speech synthesizer 140. For example, system 100 can dynamically select and retrieve menu items and read menu item attributes from a data structure stored in memory in computer system 150. If the attributes themselves indicate literal style presentation, or if a comparison of the attributes to menu item criteria indicates literal style presentation, the system 100 can provide the end user with the retrieved menu items in literal style presentation. For example, if an end user calls a directory dialer application and requests "John Smith", the system can contain several listings for "John Smith". To resolve the ambiguity of which "John Smith" was intended, the system 100 can illicit department information from the end user. Specifically, system 100 can provide the end user with the department names corresponding to each listing for "John Smith" in system 100. For example, system 100 can provide the end user with the following literal style presentation speech menu: "Please say one of the following departments: Marketing, Finance, Human Resources, Accounting". Notably, the aforementioned menu items were short one or two word phrases. If the attributes indicate representative style presentation, or a comparison of attributes to menu item criteria indicates representative style presentation, system 100 can provide the end user with the retrieved menu items in representative style presentation. For example, longer department names corresponding to each "John Smith" listing can result in system 100 providing the end user with the following representative style presentation speech menu: "For the Communications Product Hardware and Software Department press 1, For the Personal Computer Product Department including Hardware and Software press 2". Another example of a representative style speech menu can be "When you hear your desired choice, press or say 1, Communications Product Hardware and Software Department . . . Personal Computer Product Department including Hardware and Software".

Subsequently, the end user selects a menu item by uttering into a telephone handset the appropriate phrase for literal style presentation or a numeric value corresponding to the end user's desired menu item for representative style presentation. User spoken utterances delivered to system 100 through the telephone connection and telephone switching system 110 can be received by speech SRS 120 and converted to computer-recognizable text for further processing. SRSs are well known in the art and are commercially available from manufacturers such as International Business Machines Corporation.

Once a user spoken utterance has been converted to text by the SRS 110, the SRS 110 further can provide the resulting text representation of the user spoken utterance to the application program 130. The application program can process the received menu item in text form. Accordingly, the application program 130 can communicate with telephone switching system 110 to supply connection instructions for connecting the end user to an appropriate destination if the end user's selected menu item specifies a destination. Notably, the appropriate destination can be the end user specified department, for example any of the aforementioned menu items such as Human Resources or Accounting, which can correspond to any of departments 1 through 5 in FIG. 1. Alternatively, the application program 130 can instruct optional speech synthesizer 140 or an apparatus for playing recorded menu items to provide further menu items to telephone switching system 110 for transmission to the end user. In that case, the system 100 can once again dynamically select and retrieve menu items from the data structure. As before, the system 100 can present the menu items to the end user in representative or literal style presentation as appropriate and determined by the retrieved menu item attributes and item criteria.

Application program 130 can provide additional processing capabilities to the SRS 120. For example, based on the origination of the incoming call, and any previous menu items presented to the user, the application program 130 can dynamically create the speech menu. Specifically, based on call origination information, end user information, such as previous menu items selections, and end user identifying information provided by the end user, which further can be matched to end user information stored in system 100, the application program 130 can identify menu items for retrieval from a data structure within computer system 150. After identifying the appropriate menu items, the application program 130 can retrieve the menu items and provide them to the speech synthesizer 140, or alternatively, cause system 100 to play sound recordings of menu items.

Figure 2:
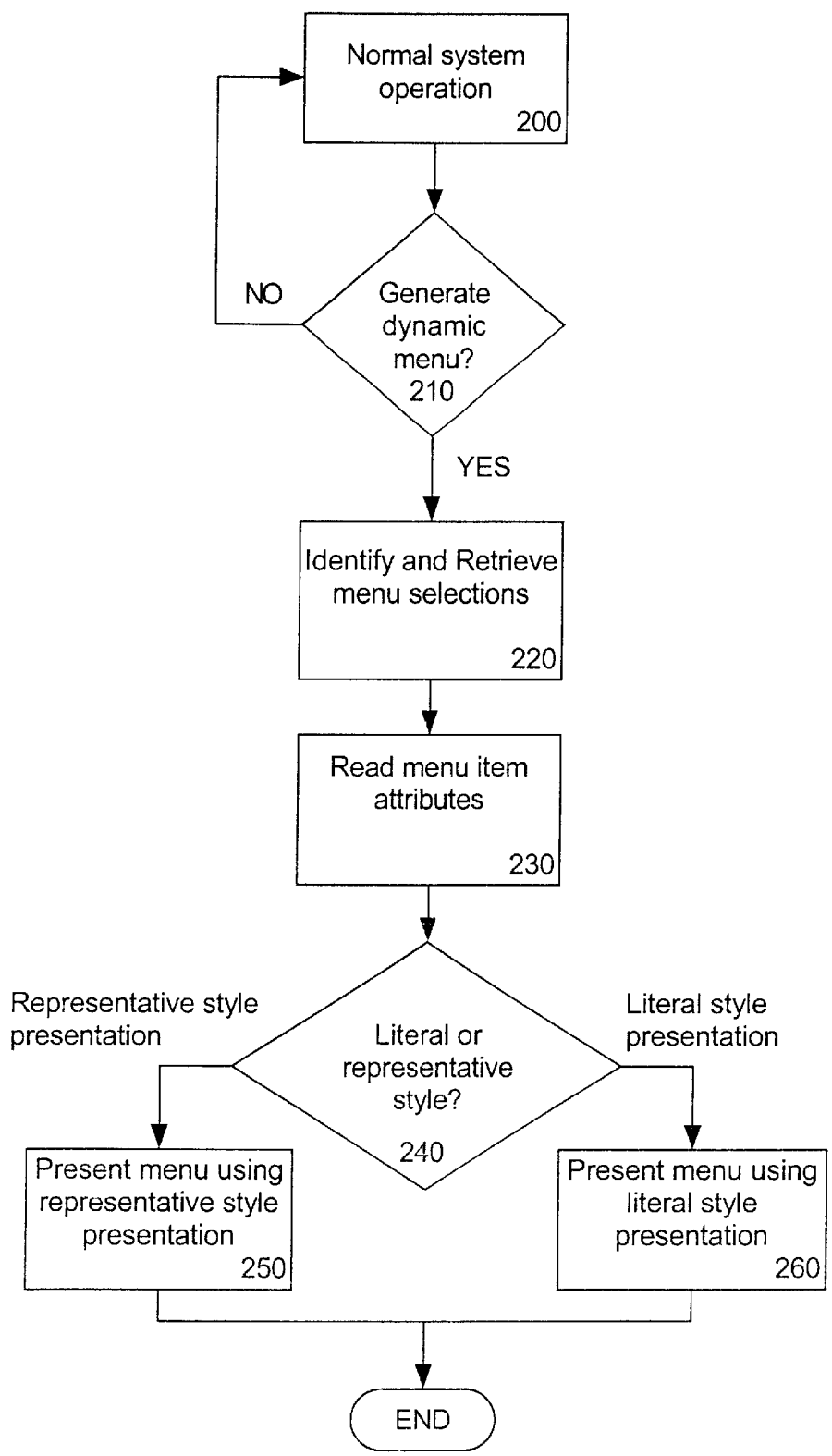
FIG. 2 is a flow chart illustrating a process for adjusting a speech menu interface.

FIG. 2 is a flow chart for illustrating a process of adjusting a speech menu interface as performed by SRS 120, application program 130, and speech synthesizer 140 (hereafter collectively referred to as the SRS). The method of the invention begins at step 200 where the SRS is in a normal operating mode awaiting a condition for dynamically selecting menu items. The SRS can continually loop between steps 200 and 210 until a condition exists indicating a need to dynamically select menu items. Notably, such conditions can be application specific. For example, a connection between the telephone switch and the SRS can result in the SRS dynamically selecting a default set of menu items from the data structure within computer 150. Additionally, upon each user selection not resolving the ultimate destination of a user phone call, the SRS can dynamically select menu items, for example submenu items. Another example of a condition can be the case where an ambiguity exists such as when the SRS locates more than one directory listing corresponding to a particular surname. If the SRS does not detect a need, or a condition does not arise requiring the SRS to dynamically select menu items, the SRS can continually loop between steps 200 and 210. If the SRS does detect such a need, the SRS can continue to step 220.

In step 220, the SRS can identify and retrieve menu items from a data structure of possible menu items. As mentioned, the menu items can be selected by the SRS based on information provided by a user, user information stored in system 100, call origination information, and the end user's location within the SRS menu structure at the time the menu is dynamically generated. For example, the SRS can identify a default set of menu items for calls originating from a call location outside of a business establishment. For calls originating from within the business establishment, a different set of menu items can be retrieved. Additionally, based on the user's previous menu selections, the SRS can identify further menu items for presentation to an end user through a speech interface. Thus, the menu items can have a hierarchical organization within the data structure. Regardless of how the SRS identifies menu items to be presented, once identified, the SRS can retrieve those menu items from the data structure. After completion of step 220, the SRS can continue to step 230.

In step 230, the SRS can read attributes of the retrieved menu items and can compare the attributes with predetermined menu item criteria. The predetermined menu item criteria can correspond to menu item complexity. As mentioned, indicators of menu item complexity can include the difficulty a user experiences in pronouncing or remembering a menu item, whether a menu item is an acronym, a foreign word, a term of art such as a medical or legal term, word lengths of individual words within a retrieved menu item, the number of text strings or words forming a menu item, the length of a sound recording, or any combination thereof. Particularly, the predetermined menu item criteria can be a threshold value corresponding any of the individual complexity indicators or to a weighted overall complexity score reflecting any combination of the complexity indicators. In the case of a threshold value corresponding to menu item length information, the threshold value can be expressed as a numerical value representing a number of characters, words, text strings, or time. For example, word length can be expressed as a number of characters, while menu item length can be expressed as a number of words, text strings, or characters. In the case of a sound recording the threshold value can be expressed as a numerical value corresponding to the number of seconds the sound recording takes to play back.

Menu item attributes can be determined dynamically or stored in memory and can be denoted by a score corresponding to the menu item complexity. For example, menu items can be scored according to the difficulty a user experiences in pronouncing or remembering a menu item, whether the menu item contains an acronym, a foreign word, or a term of art such as a medical or legal term. For menu item length attributes, the attributes can correspond, or be scored, according to the number of characters within the menu item, the number of words, text strings, or characters within the menu item, or both. In the case of a sound recording of a menu item, attributes can correspond to sound recording length expressed as a numeric value in any suitable unit of time. For example, the length can correspond to playback time of the menu item. It should be appreciated that a menu item can have one or more attributes, in varying combinations, each corresponding to one of the aforementioned indicators of menu item complexity, and each having a complexity score. Alternatively, a menu item can have a single weighted complexity score as an attribute which reflects one or more of the aforementioned indications of menu item complexity. For example, the SRS can contain a data structure of words defined as complex. The SRS can search menu items for the existence of such words. Notably, the words defined as complex can be associated with scores such that when the SRS locates a particular word within a menu item, the score for that word can be added to the overall menu item complexity score, or alternatively, serve as the menu item attribute.

In the case of menu item length attributes, the SRS can dynamically determine the attributes of the menu items. For example, the menu item "Human Resources" can have a length attribute corresponding to 2 words or text strings, or alternatively, 15 characters inclusive of spaces. The SRS also can include an attribute corresponding to lengths of individual text string or words within the menu item. Taking the previous example, the SRS can dynamically determine the number of characters comprising each word within the menu item and retain the largest numeric value as the individual word length attribute. Thus, the SRS can determine the lengths of 5 and 9 corresponding to "Human" and "Resources" respectively. Accordingly, the SRS can store the value "9" as the individual word length attribute. If the menu item is a sound recording, the attribute can be, for example, 2 seconds corresponding to the length of time the SRS requires for playback of the menu item.

In another embodiment, when the SRS dynamically determines menu item attributes, the SRS can store attributes for the largest retrieved item rather than for each item individually. Accordingly, to determine presentation style, the SRS can compare the menu item having the highest overall complexity score or highest individual attribute complexity score to item criteria. In this case, the SRS can compare menu item attributes to other menu item attributes to determine the most significant menu item, such as the menu item having the highest complexity score or largest length, for comparison against item criteria. Additionally, the SRS can keep a count corresponding to the menu item complexity score or length such that as the SRS incrementally and dynamically calculates an overall score or an individual attribute score, it can be compared against a corresponding threshold value. Thus, when the count reaches the threshold value, the SRS can stop counting and proceed to step 240 where representative style presentation can be used for presentation of the menu items.

Alternatively, the menu item attributes can be programmed within the data structure of possible menu items and be associated with their corresponding menu items. In that case, the SRS need only read the complexity score or length corresponding to each menu item. In another embodiment, each menu item attribute can be a control register where a bit corresponds to the presence or absence of one of the aforementioned complexity indicators. Several bits can be dedicated to length information. The inclusion of a control register can allow the a system designer to alter how complexity scores can be calculated. Specifically, a bit indicating the presence of a particular attribute within the menu item can be associated with a multiplier in the application program for calculating a complexity score. Notably, both the complexity scoring and the threshold values can be altered by a system designer during configuration of the system, or by an administrator during system operation.

In another embodiment, the data structure of possible menu items can include an attribute for each item indicating whether the item should be presented using literal style presentation or representative style presentation. Accordingly, the attribute can be a binary indicator, where one state can correspond to representative style presentation, and the other state can correspond to literal style presentation. In that case, the binary indicator, referred to as a flag, can correspond to length of the menu item selection, word length within a menu item selection, the length of a sound recording, or any combination thereof. Additionally, the binary indicator can correspond to the presence or absence of an acronym, a foreign word, or a term of art such as a medical or legal term, or whether a user experiences difficulty in pronouncing or remembering a menu item. For example, the SRS can be designed such that any menu item selection greater than 3 words, or any menu item containing a single word having 20 or more characters, or both, can have the attribute set to indicate presentation using representative style presentation. Additionally, in the case of a sound recording, any menu item having a playback length of more than 5 seconds can have an attribute set to indicate presentation using representative style presentation. Further, a menu item having a foreign word or a medical term can have an attribute set to indicate presentation using representative style presentation. In this embodiment, menu item criteria for comparing menu item attributes can be a design decision, rather than being included within the system as a parameter. Accordingly, the comparing step can be performed during system design when the menu item attributes are set. Thus, the attribute alone, once set, can indicate the presentation style of the menu item without requiring a comparison step during operation. Alternatively, the system can dynamically analyze the menu items once retrieved and subsequently set a flag for each menu item or for the entire set of retrieved menu items. After completion of step 230, the system proceeds to step 240.

In step 240, the system can determine whether to present the menu items using representative style presentation or literal style presentation. If the complexity score or the length attribute of the retrieved menu items is larger than the predetermined menu item criteria, the SRS can present the menu items in representative style presentation. Notably, the SRS can compare more than one attribute. For example, the SRS can compare any menu item overall complexity score or individual attribute complexity score to a corresponding menu item criteria threshold value. Thus, if any of the attributes is greater than or equal to the corresponding threshold values, the SRS can continue to step 250 to present each of the retrieved menu items in representative style presentation. If the complexity score is less than the corresponding menu item criteria threshold value, the SRS can continue to step 260 to present the retrieved menu items in literal style presentation. It further should be appreciated that the SRS need not incorporate a comparison of each attribute type, but can make use of any attribute exclusive of the others.

Regarding the case where the attribute is a binary indicator, if any of the aforementioned menu item attributes corresponds to presentation using representative style presentation, the SRS can present the retrieved menu items using representative style presentation. In that case the SRS can continue to step 250 to present each retrieved menu item using representative style presentation. If each attribute of the retrieved menu items corresponds to presentation using literal style presentation, the SRS can continue to step 260 to present the retrieved menu items using literal style presentation. After completion of steps 250 and 260, the method of the invention can end. It should be appreciated that the method can be performed repetitively such that after completion of steps 250 or 260, the SRS can loop back to step 200 to begin the method anew. Further, an indicator that any single menu item within a group of retrieved menu items is to be presented using representative style presentation can cause the SRS to present the group of retrieved menu items using representative style presentation.

The present invention can be realized in hardware, software, or a combination of hardware and software. A method and system for adjusting a speech menu interface according to the present invention can be realized in a centralized fashion in one computer system, or in a distributed fashion where different elements are spread across several interconnected computer systems. Any kind of computer system- or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method of adjusting a speech menu interface comprising:
   identifying one or more menu items from a data structure in memory, said menu items to be presented using said speech menu interface;
   retrieving said one or more menu items from said data structure;
   reading at least one attribute corresponding to said one or more menu items; and,
   based on said reading step, selecting a presentation style for presentation of said one or more menu hems using said speech menu interface.

2. The method of claim 1, further comprising:
   presenting said one or more menu items through said speech menu interface using said selected presentation style.

3. The method of claim 1, wherein said presentation style is literal style presentation.

4. The method of claim 1, wherein said presentation style is representative style presentation.

5. The method of claim 1, wherein said reading step comprises comparing said at least one attribute with menu item criteria.

6. The method of claim 5, wherein said menu item criteria includes one or more threshold value.

7. The method of claim 1, further comprising:
   determining said at least one attribute corresponding to said one or more menu items.

8. A method of adjusting a speech menu interface comprising:
   identifying one or more menu items from a data structure in memory, said menu items to be presented using said speech menu interface;
   retrieving said one or more menu items from said data structure;
   reading at least one attribute corresponding to said one or more menu items, wherein said at least one attribute is a binary indicator corresponding to the complexity of said one or more menu items; and,
   based on said reading step, selecting a presentation style for presentation of said one or more menu items using said speech menu interface.

9. A method of adjusting a speech menu interface comprising:
   identifying one or more menu items from a data structure in memory, said menu items to be presented using said speech menu interface;
   retrieving said one or more menu items from said data structure;
   reading at least one attribute corresponding to said one or more menu items, wherein said at least one attribute is a score corresponding to the complexity of said one or more menu items; and,
   based on said reading stag, selecting a presentation style for presentation of said one or more menu items using said speech menu interface.

10. A method of adjusting a speech menu interface comprising:
    identifying one or more menu items from a data structure in memory, said menu items to be presented using said speech menu interface;
    retrieving said one or more menu items from said data structure;
    reading at least one attribute corresponding to said one or more menu items, said reading step comprising comparing said ax least one attribute with menu item criteria, said menu item criteria including one or more threshold values;
    based on said reading step, selecting a presentation style for presentation of said one or more menu items using said speech menu interface; and,
    presenting said one or more menu items through said speech menu interface using said selected presentation style.

11. A machine readable storage, having stored thereon a computer program having a plurality of code sections executable by a machine for causing the machine to perform the steps of:
    identifying one or more menu items from a data structure in memory, said menu items to be presented using a speech menu interface;
    retrieving said one or more menu items from said data structure;
    reading at least one attribute corresponding to said one or more menu items; and,
    based on said reading step, selecting a presentation style for presentation of said one or more menu items using said speech menu interface.

12. The machine readable storage of claim 11 further comprising:
    presenting said one or more menu items through said speech menu interface using said selected presentation style.

13. The machine readable storage of claim 11, wherein said presentation style is literal style presentation.

14. The machine readable storage of claim 11, wherein said presentation style is representative style presentation.

15. The machine readable storage of claim 11, wherein said reading step comprises comparing said at least one attribute with menu item criteria.

16. The machine readable storage of claim 15, wherein said menu item criteria includes one or more threshold values.

17. The machine readable storage of claim 11, further comprising:
    determining said at least one attribute corresponding to said one or more menu items.

18. A machine readable storage, having stored thereon a computer program having a plurality of code sections executable by a machine for causing the machine to perform the steps of:
    identifying one or more menu items from a data structure in memory, said menu items to be presented using a speech menu interface;
    retrieving said one or more menu items from said data structure;
    reading at least one attribute corresponding to said one or more menu items, wherein said at least one attribute is a binary indicator corresponding to the complexity of said one or more menu items; and,
    based on said reading step, selecting a presentation style for presentation of said one or more menu items using said speech menu interface.

19. A machine readable storage, having stored thereon a computer program having a plurality of code sections executable by a machine for causing the machine to perform the step of:
    identifying one or more menu items from a data structure in memory, said menu items to be presented using a speech menu interface;

retrieving said one or more menu items from said data structure;

reading at least one attribute corresponding to said one or more menu items, wherein said at least one attribute is a score corresponding to the complexity of said one or more menu items; and, based on said reading step, selecting a presentation style for presentation of said one or more menu items using said speech menu interface.

\* \* \* \* \*